US00RE41275E

(19) United States
(12) Reissued Patent
Tsuda et al.

(10) Patent Number: US RE41,275 E
(45) Date of Reissued Patent: Apr. 27, 2010

(54) INDEXABLE INSERT AND CUTTING TOOL HAVING INDEXABLE INSERT

(75) Inventors: Yuuichi Tsuda, Kagoshima (JP); Kiyotada Takayanagi, Kyoto (JP); Taira Kawasaki, Kagoshima (JP); Hiroaki Kubo, Kagoshima (JP); Toshihisa Hokakoba, Kagoshima (JP)

(73) Assignee: Kyocera Corporation, Kyoto (JP)

(21) Appl. No.: 10/460,703

(22) Filed: Jun. 11, 2003

Related U.S. Patent Documents

Reissue of:
(64) Patent No.: 6,244,789
Issued: Jun. 12, 2001
Appl. No.: 09/387,346
Filed: Aug. 31, 1999

(30) Foreign Application Priority Data

Aug. 31, 1998 (JP) ..... 10-245675

(51) Int. Cl.
*B23B 27/02* (2006.01)

(52) U.S. Cl. ..... 407/107; 407/110; 407/114; 407/116

(58) Field of Classification Search ..... 407/100–105, 407/110, 114–116, 66, 91, 107, 94, 97, 109, 407/119
See application file for complete search history.

(56) References Cited

U.S. PATENT DOCUMENTS 2,571,395 A * 10/1951 Vawter ..... 408/82
2,657,597 A * 11/1953 Pickering et al. ..... 408/200
2,663,203 A * 12/1953 Fried et al. ..... 408/154
2,706,421 A * 4/1955 Fried et al. ..... 82/1.2
2,745,299 A * 5/1956 Fried ..... 82/1.2
3,017,791 A * 1/1962 Fried ..... 82/1.2
3,361,013 A * 1/1968 Vindez ..... 408/154
3,758,927 A * 9/1973 Stein ..... 407/101
4,396,315 A * 8/1983 Middleton ..... 407/41
4,607,988 A * 8/1986 Salm et al. ..... 407/114
5,362,183 A * 11/1994 Alario et al. ..... 407/119
6,126,366 A 10/2000 Lundblad
6,481,936 B1 * 11/2002 Hecht ..... 407/111
6,769,843 B2 * 8/2004 Hansson ..... 407/91
7,001,115 B2 * 2/2006 Erickson et al. ..... 407/113

FOREIGN PATENT DOCUMENTS

| | | | |
|---|---|---|---|
| DE | 25 13 020 | | 10/1976 |
| DE | 28 54 149 | | 7/1980 |
| EP | 0 385 280 | | 9/1990 |
| FR | 754 849 | | 11/1933 |
| JP | 01-234104 | | 9/1989 |
| JP | 02-035602 | | 2/1990 |
| JP | 2003236709 | A * | 8/2003 |
| JP | 2003340611 | A * | 12/2003 |
| WO | 97/27019 | | 7/1997 |

* cited by examiner

*Primary Examiner*—Sara Addisu
(74) *Attorney, Agent, or Firm*—Hogan & Hartson LLP

(57) ABSTRACT

The indexable insert of the present invention has a cutting edge at the end of a stick-shaped portion projecting from a tool base. The base is shaped to ensure effective clamping, thereby avoiding chatter and backlash. A cutting edge and a rake face are provided at the end of the stick-shaped portion, which is also provided with a side relief face so that chips cut from the workpiece are smoothly carried away. The cutting edge extends sideways beyond the side relief face so that the insert can effectively cut the walls of small and deep holes.

8 Claims, 5 Drawing Sheets

Amended
FIG. 1A
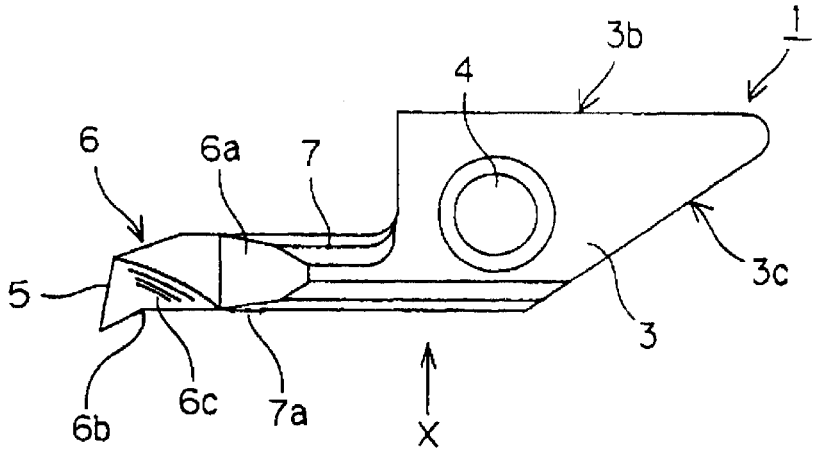

INDEXABLE INSERT AND CUTTING TOOL HAVING INDEXABLE INSERT

Matter enclosed in heavy brackets [ ] appears in the original patent but forms no part of this reissue specification; matter printed in italics indicates the additions made by reissue.

This application is based on an application No. 10-245675 filed in Japan, the content of which is incorporated hereinto by reference.

BACKGROUND OF THE INVENTION

1. Field of the Invention

The present invention relates generally to an indexable insert for cutting processing and a cutting tool having the indexable insert. More specifically, it relates to an indexable insert and a cutting tool having the indexable insert suitable for inner diameter processing of a small hole or a very small hole in a small-sized component such as a component for OA equipment, an electronic component, or a small diameter bearing.

2. Description of the Prior Art

Conventionally used as an inner diameter processing tool have been a throwaway type in which a chip 22 is fastened to a front end of a holder 21 so as to be attachable or detachable as shown in FIG. 6 and a brazing type in which a chip 32 is fastened by brazing to a front end of a holder 31 as shown in FIG. 7.

The brazing type requires a lot of time to replace the chip 32 when the chip's edge is damaged, which is not economical. Accordingly, the throwaway type is currently used in most cases.

The throwaway type is generally used for processing a large-diameter hole in a large-sized component such as an automobile component, however, this type is not used for processing a very small-diameter hole in a small-sized component such as a component for OA equipment or an electronic component. A solid cutting tool as shown in FIG. 8 is generally used for processing the very small-diameter hole.

Referring to FIG. 8, the integral cutting tool is constituted by a chip 45 and a sleeve 46 for supporting the chip 45 by fastening. The chip 45 is generally formed by cutting a cylindrical member, so that a cutting edge 44 and a holder 43 are integrally composed of the same material.

The chip 45 of such a solid type has a structure in which the holder 43 is inserted into the sleeve 46, and is fixed to the sleeve 46 by tightening a set bolt (not shown) from the outside of the sleeve 46.

In such a structure, a force for the sleeve 46 to clamp the indexable insert 45 is weak, so that chatter vibration is liable to be generated in the chip 45. The repetition accuracy of the cutting edge 44 is low. Further, the diameter at a front end of the sleeve 46 is larger than that of the cutting edge 44 of the chip 45, so that a front end surface of the sleeve 46 expands in a collar shape toward the chip 45. Therefore, the front end surface of the sleeve 46 is positioned so as to close a hole of a work piece at the time of inner diameter cutting processing, resulting in poor cutting chip discharge properties. Further, when the sleeve 46 is used, undercut processing cannot be performed.

SUMMARY OF THE INVENTION

The present invention has been made in order to solve the above-mentioned problems of the prior art.

A primary object of the present invention is to provide an indexable insert having good clamping properties. Another object of the present invention is to provide a cutting tool for reliably clamping the indexable insert not to generate chatter vibration. Still another object of the present invention is to provide a cutting tool with high index accuracy at the position of a cutting edge. A further object of the present invention is to provide a high-performance indexable insert being superior in cutting chip discharge properties and capable of performing undercut processing and an inner diameter cutting processing.

The above-mentioned objects of the present invention are achieved by an indexable insert as set forth in claim 1 and a cutting tool as set forth in claim 5.

As described in claim 1, an indexable insert according to the present invention has a base and a stick-shaped portion which are integrally formed. The base comprises a bottom surface placed on a seating surface of a holder and a first side surface and a second side surface. The indexable insert is attachable to the holder such that backlash is prevented by clamping the first side surface and the second side surface.

A cutting edge and a rake face are provided at a front end of the stick-shaped portion. Moreover, one side surface of the stick-shaped portion is a side relief face, and connects with the base with no step. Accordingly, cutting chips are satisfactorily removed.

The indexable insert is formed of the same material. Accordingly, it is preferable that the diameter of the stick-shaped portion and the thickness of the base are the same, as described in claim 2.

As described in claim 3, when a side curved surface and a recessed notch connecting with the side relief face are formed on the rake face, cutting chips are smoothly guided to the side relief face.

When the cutting edge has brought into a concavely curved shape, as described in claim 4, cutting chips are curled, so that the cutting chips are easily removed.

A cutting tool according to the present invention constrains the indexable insert by a first clamp surface and a second clamp surface, as described in claim 5. More specifically, a side surface of the base of the indexable insert is clamped at four points by a projection at a front end of the first clamp surface, two projections at a front end and a rear end of the second clamp surface, and a set bolt at a rear end of the first clamp surface. Accordingly, neither backlash nor chatter vibration is produced in the indexable insert attached to the holder during cutting.

The base of the indexable insert fitted in an insert pocket of the holder is not concealed as in a case where a sleeve is used but is exposed from the holder. That is, a top surface of the indexable insert fixed to the holder is exposed from the holder. Therefore, the indexable insert is easily attached to the holder. Moreover, the indexable insert can be firmly fixed to the holder using a bolt, a clamp, or the like. Accordingly, it is possible to prevent chatter vibration from being generated in the indexable insert.

The side relief face of the indexable insert connects with one side surface of the holder so as to be flush therewith, so that the holder does not prevent the cutting chips from being removed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a top plan view of an indexable insert according to one embodiment of the present invention.

DESCRIPTION OF EMBODIMENTS

Figure 1B:
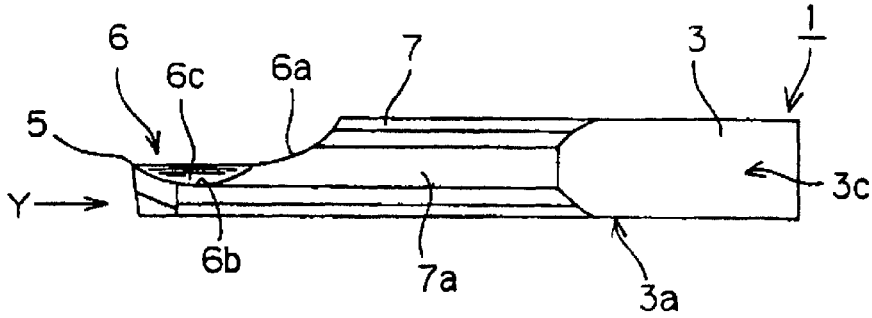
FIG. 1B is a perspective view taken along a line X shown in FIG. 1A.
Figure 1C:
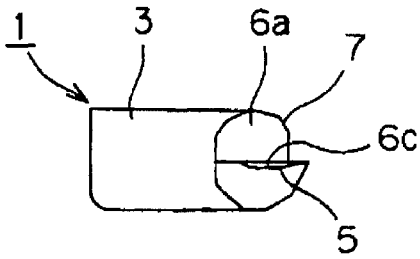
FIG. 1C is a perspective view taken along a line Y shown in FIG. 1B.

FIG. 1A is a top plan view of an indexable insert 1 according to one embodiment of the present invention, FIG. 1B is a perspective view taken along a line X shown in FIG. 1A (a front view of the indexable insert 1), and FIG. 1C is a perspective view taken along a line Y shown in FIG. 1B (a left side view of the indexable insert 1).

Referring to FIGS. 1A to 1C, the indexable insert 1 has a flat plate-shaped base 3 at its rear (on the right side of FIGS. 1A and 1B). The base 3 comprises a bottom surface 3a which is abutted, when it is attached to a holder, described later, against the holder, and a first side surface 3b and a second side surface 3c. The first side surface 3b and the second side surface 3c extend so as to cross each other in an acute-angled manner at the rear. Near the center of the base 3, a bolt hole 4 through which a bolt is to be passed is formed along the thickness of the base 3.

A stick-shaped portion 7 extends toward a front end of the indexable insert 1 (on the left side of FIGS. 1A and 1B) from the base 3. The stick-shaped portion 7 extends in a direction parallel to the first side surface 3b, and its rear end crosses the second side surface 3c. A front cutting edge 5 is formed at a front edge of the stick-shaped portion 7, and a rake face 6 is formed so as to connect with the front cutting edge 5. The front cutting edge 5 has its part projecting sideward so as to form a side relief face 7a along the length of the stick-shaped portion 7.

The rake face 6 has a chip breaker projected surface 6a at its rear, and has a side curved surface 6c at its front. An edge of the side curved surface 6c connecting with the side relief face 7a has a recessed notch 6b.

In such construction, cutting chips cut by the front cutting edge 5 pass through the side curved surface 6c of the rake face 6, and are guided from the recessed notch 6b to the side relief face 7a.

As shown in FIG. 1C, the front cutting edge 5 is concavely curved downward, so that the cutting chips are easily curled in a spiral shape, and the curled cutting chips are easily discharged to the side relief face 7a from the side curved surface 6c through the recessed notch 6b.

Figure 2A:
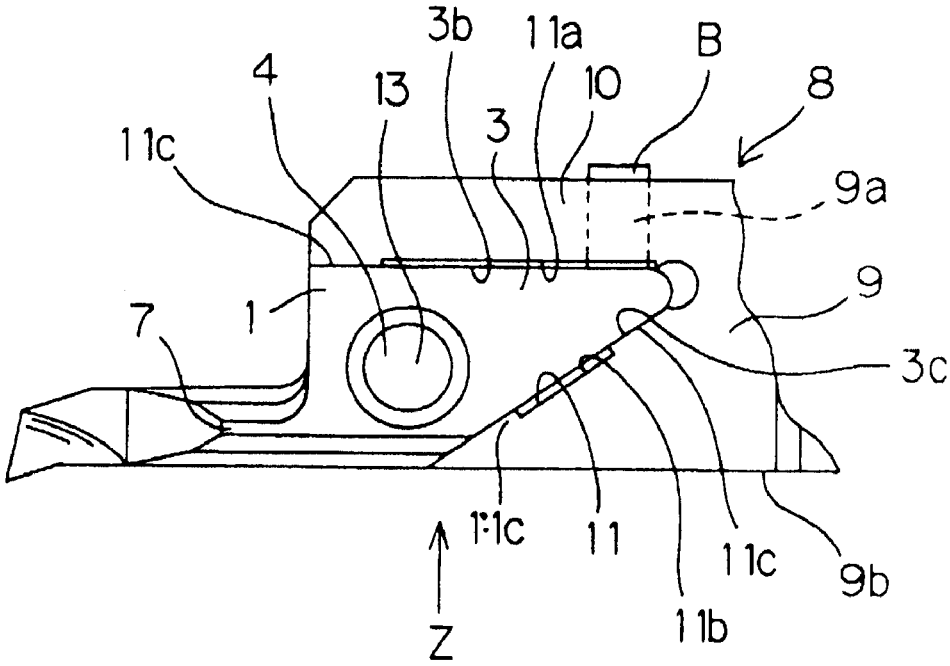
FIG. 2A is a top plan view of a cutting tool according to one embodiment of the present invention in which the indexable insert of FIG. 1A is mounted on a holder.
Figure 2B:
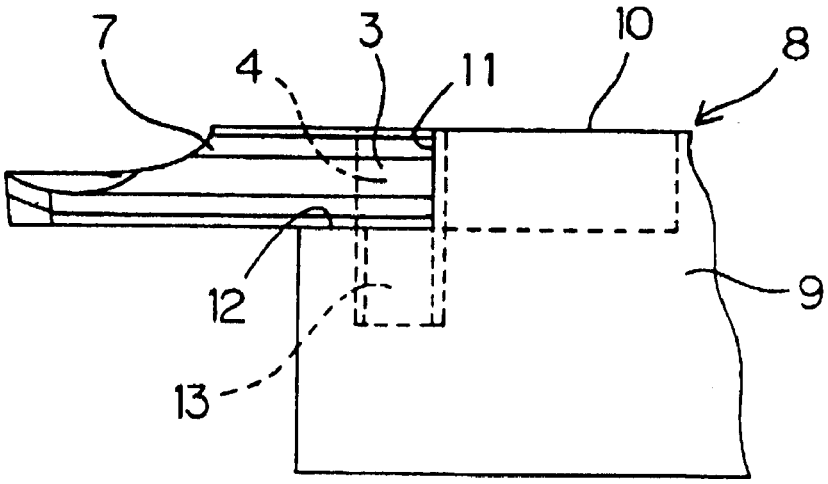
FIG. 2B is a perspective view taken along a line Z shown in FIG. 2A.

FIG. 2A is a top plan view of a cutting tool 8 according to one embodiment of the present invention in which the indexable insert 1 is mounted on a holder 9. FIG. 2B is a perspective view taken along a line Z shown in FIG. 2A (a front view of the cutting tool 8). For convenience, the root of the holder 9 is omitted, and a fixing bolt is also omitted in FIGS. 2A and 2B.

Referring to FIGS. 2A and 2B, the holder 9 is a prism-shaped longitudinal member having a root extending rightward (not shown), and the root is fixed to a machine. An insert pocket 11 in which the base 3 of the indexable insert 1 is to be fitted is formed on a top surface 10 at a front end of the holder 9. The insert pocket 11 comprises a seating surface 12 parallel to the top surface 10, a first clamp side surface 11a cut from a front end surface of the holder 9, and a second clamp side surface 11b cut from a side surface 9b of the holder 9.

The bottom surface 3a of the base 3 of the indexable insert 1 is placed on the seating surface 12 of the insert pocket 11. A fixing bolt (not shown) is inserted through the bolt hole 4 from above the base 3. A tapped hole 13 is formed in a position communicating with the bolt hole 4 of the base 3. Accordingly, a front end of the fixing bolt which is inserted through the bolt hole 4 is screwed into the tapped hole 13. The indexable insert is thus fixed to the holder 9.

The top surface of the indexable insert 1 fixed to the holder 9 is exposed from the holder 9. Therefore, the indexable insert 1 is easily attached to the holder 9. Moreover, the indexable insert 1 can be firmly fixed to the holder 9 using a bolt, a clamp, or the like, as described above. Accordingly, it is possible to prevent chatter vibration from being generated.

When the indexable insert 1 is fixed to the holder 9, the stick-shaped portion 7 of the indexable insert 1 is brought into a state where it projects from the front end of the holder 9. By inserting the stick-shaped portion 7 into a small hole of a work piece, therefore, the small hole can be processed as if an ear were picked by an ear pick.

Although the indexable insert 1 is firmly fixed to the holder 9, the following constraining structure is also employed such that no backlash is produced in the indexable insert 1 in the present embodiment.

As shown in FIG. 2A, when the indexable insert 1 is fitted in the insert pocket 11, the first side surface 3b of the base 3 is opposite to the first clamp side surface 11a of the insert pocket 11, and the second side surface 3c of the base 3 is opposite to the second clamp side surface 11b of the insert pocket 11. A slightly expanding projection 11c is formed at a front end of the first clamp side surface 11a. Projections 11c are respectively formed at both a front end and a rear end of the second clamp side surface 11B. Further, a through tapped hole 9a is formed at a rear end of the first clamp surface 11a on one side surface of the holder 9 (the upper surface in FIG. 2A). A set bolt B is fitted in the through tapped hole 9a. After the indexable insert 1 is fitted in the insert pocket 11 and is fixed thereto by the fixing bolt, therefore, the set bolt B is tightened. Accordingly, a side surface of the base 3 is locked at four points by the three projections 11c and the set bolt B in the insert pocket 11. Even when there is a slight difference between an inner shape of the insert pocket 11 and an outer shape of the base 3 of the indexable insert 1, therefore, the indexable insert 1 can be reliably fixed to the holder 9. As a result, neither backlash nor chatter vibration is produced in the indexable insert 1 during processing.

The side relief face 7a of the indexable insert 1 fixed to the holder 9 is flush with the one side surface 9b of the holder 9. Therefore, the front end of the holder 9 does not prevent cutting chips from being discharged, as described later.

Figure 3A:
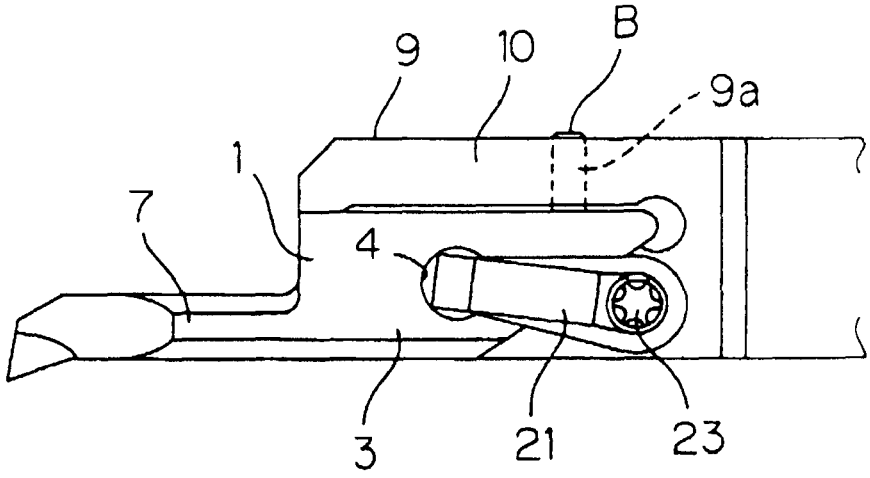
FIG. 3A is a top plan view of a cutting tool according to another embodiment of the present invention in which an indexable insert is fixed by a clamp.
Figure 3B:
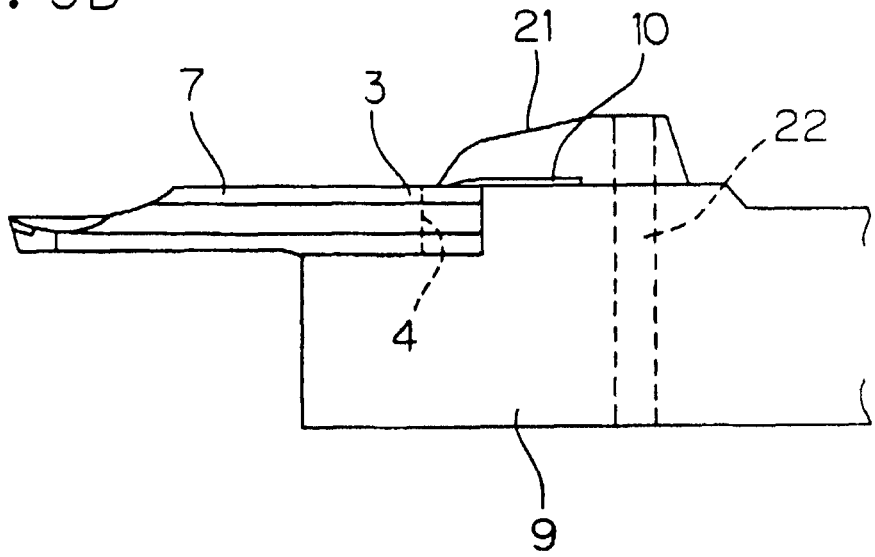
FIG. 3B is a front view thereof.

FIGS. 3A and 3B are respectively a top plan view and a front view of a cutting tool 8 according to another embodiment of the present invention in which the fixing bolt is replaced with a clamp for fixing an indexable insert to a holder.

A clamp 21 is provided so as to be rotatable along an upper surface 10 of a holder 9. Although a rotary supporting shaft 22 of the clamp 21 vertically penetrates the holder 9 in the present embodiment, it may not penetrate the holder 9.

An indexable insert 1 is fitted in an insert pocket 11, and the clamp 21 is rotated so that its front end presses the indexable insert 1. A screw 23 at the top of the rotary supporting shaft 22 is tightened. Consequently, the indexable insert 1 is fixed by the clamp 21.

When the indexable insert 1 is fixed by the clamp 21, a bolt hole 4 may not be provided in a base 3 of the indexable insert 1.

In FIGS. 3A and 3B, the same reference numerals are assigned to the same portions as those shown in FIGS. 2A and 2B.

Figure 4:
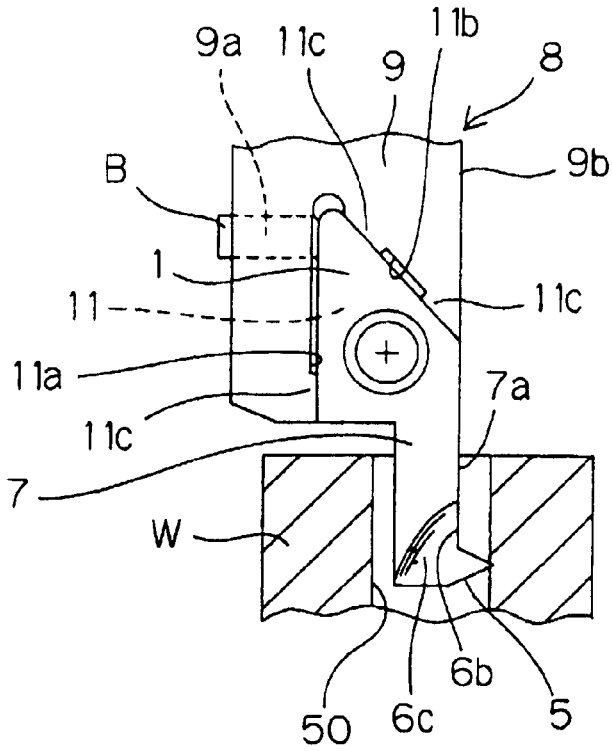
FIG. 4 is an illustration showing how cutting processing is performed using a cutting tool according to one embodiment of the present invention.

FIG. 4 is an illustration showing how cutting processing is performed using the cutting tool 8 according to one embodiment of the present invention. The stick-shaped portion 7 of the indexable insert 1 is inserted into a hole 50 of a work piece W, to perform boring, for example. By using the cutting tool 8, the side relief face 7a formed in the stick-shaped portion 7 is flush with the one side surface 9b of the holder 9. Accordingly, the front end surface of the holder 9 does not project toward the side relief face 7a with a step, so that the cutting chips are smoothly discharged. Specifically, a discharge path of the cutting chips is not blocked up in the vicinity of an outlet of the hole 50 of the work piece W. Accordingly, the cutting chips can be smoothly discharged. Particularly in the present embodiment, the rake face 6 of the indexable insert 1 is provided with the side curved surface 6c, and the side curved surface 6c connects with the side relief face 7a by the recessed notch 6b. Accordingly, the cutting chips are guided to the outlet of the hole 50 of the work piece W from the recessed notch 6b through the side relief face 7a, resulting in very good cutting chip discharge properties.

Figure 5:
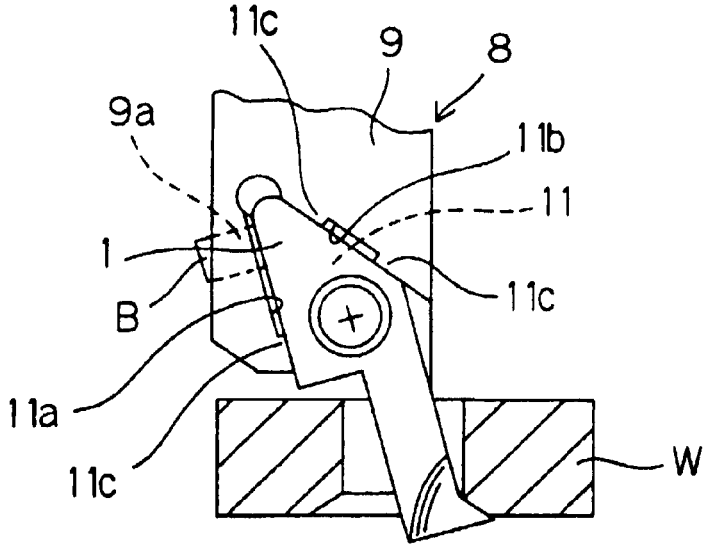
FIG. 5 is an illustration showing how cutting processing is performed using a cutting tool according to another embodiment of the present invention.
Figure 6:
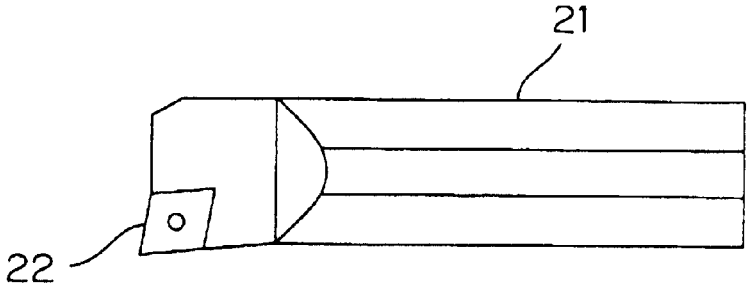
FIG. 6 PRIOR ART
FIGS. 6, 7 and 8 are respectively schematic views showing a conventional cutting tool.
Figure 7:
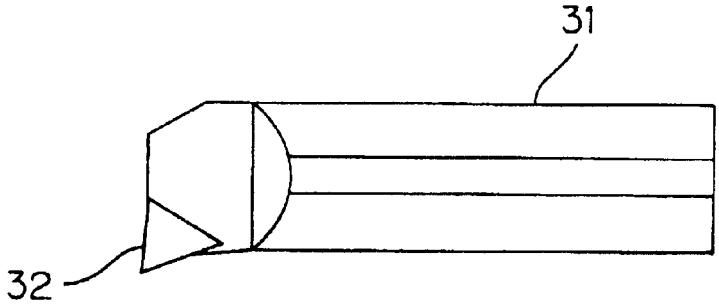
FIG. 7 PRIOR ART
Figure 8:
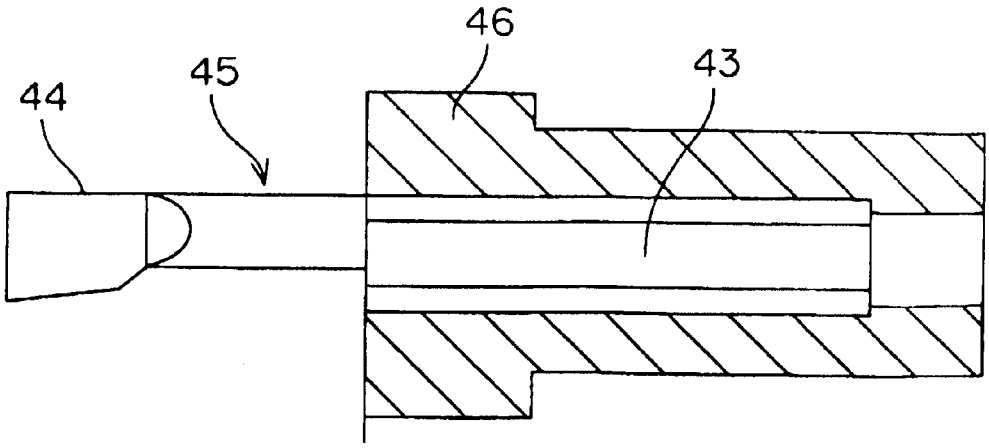
FIG. 8 PRIOR ART

FIG. 5 illustrates another embodiment of the present invention. As shown in FIG. 5, an indexable insert 1 may be attached to a holder 9 such that the axial direction of the holder 9 and the axial direction of a stick-shaped portion 7 of the indexable insert 1 are not parallel to each other, and an angle is provided therebetween. In such an attaching structure, undercut processing is possible in a hole 50 of a work piece W.

The indexable insert 1 of this invention may be made of cermet material or hard metal material. The holder 9 may be made of an alloy steel such as Cr—Mo alloy steel, Ni—Cr alloy steel or Ni—Cr—Mo alloy steel, or an alloy steel which elements such as Cr, W, Mn, Mo and V are added to an Carbide alloy steel including five elements of C, Si, Mn, P and S.

An illustrative manufacturing method of the indexable insert 1 will be explained as follows:

Grains of starting materials such as TiC, WC, Co, TiC, TaC are crushed and mixed to form mixed powder. The obtained mixed powder is filled up in a forming die which has a similar figure to the indexable insert 1 and pressed to form a press molded body. Then the press molded body is sintered. After sintering of the obtained body of the indexable insert 1, the two side faces of the above stick-shaped portion 7, namely the side relief face 7a and the side face opposite to the said side relief face 7a, and the rake face 6 are subjected to the polishing process to form a finished product of the indexable insert 1. According to this method, the manufacturing cost is much lowered because amount of the polishing process is minimized.

On the other hand, the holder 9 can be obtained by subjecting a blank bar of the above alloy steel to cutting processing with cutting tools such as end-mill tools.

While the embodiment of the present invention has thus been described in detail, it should be understood that the embodiment is merely illustrative of the technical principles of the present invention but not limitative of the same. The spirit and scope of the present invention are to be limited only by the appended claims.

What is claimed is:

[1. An indexable insert attached to a holder for cutting processing, comprising:

a plate-shaped base having a top surface and a bottom surface, the base having a first side surface approximately perpendicular to the top surface and the bottom surface and a second side surface approximately perpendicular to the top surface and the bottom surface and having its rear end crossing the first side surface at an acute-angle, a stick-shaped portion formed integrally with said base and having its one first side surface extending forward from the base such that there is no step from a side surface of the base, an axis of the stick-shaped portion being parallel to the first side surface of the base, a cutting edge and a rake face connecting therewith being provided at a front end of the stick-shaped portion, a part of said cutting edge projecting sideward from the stick-shaped portion, said one side surface of the stick-shaped portion constituting a side relief face.]

[2. The indexable insert according to claim 1, wherein a thickness of said stick-shaped portion is equal to a thickness of the base.]

[3. The indexable insert according to claim 2, wherein said rake face has a side curved surface and a recessed notch connecting with the side relief face provided so as to connect with the side curved surface.]

[4. The indexable insert according to claim 3, wherein the cutting edge has in a concavely curved shape.]

5. [A cutting tool having the indexable insert according to claim 1, comprising:

a prism-shaped holder;

an insert pocket recessed on a top surface at a front end of the holder in which the indexable insert is to be fitted, the insert pocket comprising a seating surface on which the bottom surface of the indexable insert is to be placed, a first clamp surface connecting with a front end surface of the holder and opposite the first side surface of the indexable insert when the insert is fitted, and a second clamp surface connecting with a first side surface of the holder and opposite the second side surface of the indexable insert when the insert is fitted;

projections abutted against the side surfaces of the indexable insert when the insert is fitted, which projections are provided at a front end of the first clamp surface and at a front end and a rear end of the second clamp surface;

a through tapped hole, in which a set bolt is to be fitted, extending from a second side surface of the holder to a rear end of the first clamp surface.] *A cutting tool comprising:*

*an indexable insert attached to a holder for cutting processing, including*

*a plate-shaped base having a top surface and a bottom surface, the base having a first side surface approximately perpendicular to the top surface and the bot-*

*tom surface and a second side surface approximately perpendicular to the top surface and the bottom surface and having its rear end crossing the first side surface at an acute-angle,*

*a stick-shaped portion formed integrally with said base and having its one first side surface extending forward from the base such that there is no step from a side surface of the base, an axis of the stick-shaped portion being parallel to the first side surface of the base, a cutting edge and a rake face connecting therewith being provided at a front end of the stick-shaped portion, a part of said cutting edge projecting sideward from the stick-shaped portion, said one said surface of the stick-shaped portion constituting a side relief face; and*

*a prism-shaped holder including*

*an insert pocket recessed on a top surface at a front end of the holder in which the indexable insert is to be fitted, the insert pocket comprising a seating surface on which the bottom surface of the indexable insert is to be placed, a first clamp surface connecting with a front end surface of the holder and opposite the first side surface of the indexable insert when the insert is fitted, and a second clamp surface connecting with a first side surface of the holder and opposite the second side surface of the indexable insert when the insert is fitted,*

*projections abutted against the side surfaces of the indexable insert when the insert is fitted, which projections are provided at a front end of the first clamp surface and at a front end and a rear end of the second clamp surface,*

*a through tapped hole, in which a set bolt is to be fitted, extending from a second side surface of the holder to a rear end of the first clamp surface.*

6. The cutting tool according to claim 5 further comprising:

a bolt hole in the base of said indexable insert;

a tapped hole in the seating surface of the insert pocket; and a fixing bolt inserted into the bolt hole from the top surface of the indexable insert fitted in the insert pocket with its front end screwed into the tapped hole so that the indexable insert is fixed to the holder.

[7. An indexable insert attached to a holder for process cutting comprising:

a plate-shaped base having a top surface and a bottom surface, the base having a first side surface approximately perpendicular to the top surface and the bottom surface, and a second side surface approximately perpendicular to the top surface and the bottom surface and having its rear end crossing the first side surface at an acute angle;

a stick-shaped portion formed integrally with said base and having its one surface extending forward from the base such that there is no step from a surface of the base, an axis of the stick-shaped portion being parallel to the first side surface of the base, a cutting edge and rake face connecting therewith being provided at a front end of the stick-shaped portion, a part of said cutting edge projecting beyond a thickness of the stick-shaped portion, said one surface of the stick-shaped portion constituting a relief face.]

*8. A cutting tool comprising:*

*an indexable insert attached to a holder for cutting processing, including*

*a plate-shaped base having a top surface and a bottom surface, the base having a first side surface approximately perpendicular to the top surface and the bottom surface and a second side surface approximately perpendicular to the top surface and the bottom surface and having its rear end crossing the first side surface at an angle,*

*a stick-shaped portion formed integrally with said base and having its one first side surface extending forward from the base such that there is no step from a side surface of the base, an axis of the stick-shaped portion being parallel to the first side surface of the base, a cutting edge and a rake face connecting therewith being provided at a front end of the stick-shaped portion, a part of said cutting edge projecting sideward from the stick-shaped portion, said one said surface of the stick-shaped portion constituting a side relief face; and*

*a prism-shaped holder including*

*an insert pocket recessed on a top surface at a front end of the holder in which the indexable insert is to be fitted, the insert pocket comprising a seating surface on which the bottom surface of the indexable insert is to be placed, a first clamp surface connecting with a front end surface of the holder and opposite the first side surface of the indexable insert when the insert is fitted, and a second clamp surface connecting with a first side surface of the holder and opposite the second side surface of the indexable insert when the insert is fitted,*

*projections abutted against the side surfaces of the indexable insert when the insert is fitted, which projections are provided at a front end of the first clamp surface and at a front end and a rear end of the second clamp surface,*

*a through tapped hole, in which a set bolt is to be fitted, extending from a second side surface of the holder to a rear end of the first clamp surface.*

*9. The cutting tool according to claim 8 further comprising:*

*a bolt hole in the base of said indexable insert; a tapped hole in the seating surface of the insert pocket; and*

*a fixing bolt inserted into the bolt hole from the top surface of the indexable insert fitted in the insert pocket with its front end screwed into the tapped hole so that the indexable insert is fixed to the holder.*

*10. A cutting tool comprising:*

*an indexable insert for cutting an interior side surface of a hole formed in a work piece, including*

*a base having a top surface and a flat bottom surface, the base having a first side surface including a flat face and a second side surface including a flat face and having its rear end crossing the first side at an angle,*

*a projecting portion formed integrally with said base and extending forward in a first direction, the end of the projecting portion connected to the corner portion of the base, an axis of the projecting portion being substantially parallel to the first side surface of the base, a cutting edge and a rake face connecting therewith being provided at a front end of the projecting portion, a part of said cutting edge projecting in a second direction which is perpendicular to the first direction; and*

*a holder including*

*an insert pocket recessed on a top surface at a front end of the holder in which the indexable insert is to be*

*fitted, the insert pocket comprising a seating surface on which the bottom surface of the indexable insert is to be placed, a first clamp surface connecting with a front end surface of the holder and opposite to the first side surface of the indexable insert, and a second clamp surface connecting with one side of the holder and opposite to the second side surface of the indexable insert.*

*11. The indexable insert according to claim 10, wherein the first side surface and the second side surface cross each other in an acute angle at the rear end of the base.*

*12. The cutting tool according to claim 11, further comprising:*

*projections abutted against the first and second side surfaces of the indexable insert which are respectively provided at a front end of the first clamp surface and a front end and a rear end of the second clamp surface; and*

*a through tapped hole, in which a set bolt is to be fitted, provided from the side of the holder to penetrate the rear end of the first clamp surface.*

*13. A cutting tool comprising:*

*an indexable insert for cutting an interior side surface of a hole formed in a work piece, including*

*a base having a top surface and a flat bottom surface, the base having a first side surface including a flat face and a second side surface including a flat face having its rear end crossing the first side surface at an angle,*

*a projecting portion formed integrally with said base and extending forward in a first direction, the end of the projecting portion connected to the corner portion of the base, an axis of the projecting portion being substantially parallel to the first side surface of the base, a cutting edge and a rake face connecting therewith being provided at a front end of the projection portion, a part of said cutting edge projecting in a second direction which is perpendicular to the first direction,*

*wherein the projecting portion has a side relief face extending forward from the base to the part of the cutting edge; and*

*a holder including*

*an insert pocket recessed on a top surface at a front end of the holder in which the indexable insert is to be fitted, the insert pocket comprising a seating surface on which the bottom surface of the indexable insert is to be placed, a first clamp surface connecting with a front end surface of the holder and opposite to the first side surface of the indexable insert, and a second clamp surface connecting with one side surface of the holder and opposite to the second side of the indexable insert,*

*wherein the side relief face is flush with one surface of the holder.*

* * * * *